United States Patent
Senjo et al.

(10) Patent No.: US 8,523,499 B2
(45) Date of Patent: Sep. 3, 2013

(54) WORKING DEVICE

(75) Inventors: Takeshi Senjo, Shizuoka (JP);
Masaharu Nakajima, Shizuoka (JP)

(73) Assignee: Senjo Seiki Co., Ltd., Shizuoka-shi, Shizuoka (JP)

( * ) Notice: Subject to any disclaimer, the term of this patent is extended or adjusted under 35 U.S.C. 154(b) by 864 days.

(21) Appl. No.: 12/733,299

(22) PCT Filed: Sep. 1, 2008

(86) PCT No.: PCT/JP2008/065654
§ 371 (c)(1),
(2), (4) Date: Feb. 23, 2010

(87) PCT Pub. No.: WO2010/023764
PCT Pub. Date: Mar. 4, 2010

(65) Prior Publication Data
US 2011/0044777 A1 Feb. 24, 2011

(51) Int. Cl.
*B23F 19/10* (2006.01)
*B23C 3/12* (2006.01)
*B23C 1/06* (2006.01)
*B23C 1/08* (2006.01)
*B23C 1/14* (2006.01)

(52) U.S. Cl.
USPC ...... 409/8; 409/55; 409/61; 409/62; 409/165; 409/138; 409/140

(58) Field of Classification Search
USPC .............. 409/8, 138, 125–126, 3, 38, 40, 50, 409/52, 55, 61, 62, 165–166, 139–140, 192, 409/203, 213, 217; 451/47, 147
See application file for complete search history.

(56) References Cited

U.S. PATENT DOCUMENTS

| | | | | |
|---|---|---|---|---|
| 3,714,740 A | * | 2/1973 | Steinhardt | 451/121 |
| 3,766,688 A | * | 10/1973 | Maytay | 451/210 |
| 4,012,990 A | * | 3/1977 | Wagner | 409/8 |
| 5,146,670 A | * | 9/1992 | Jones | 409/138 |

(Continued)

FOREIGN PATENT DOCUMENTS

| | | | |
|---|---|---|---|
| GB | 1065417 A | * | 4/1967 |
| JP | 4-106148 U | | 9/1992 |

(Continued)

OTHER PUBLICATIONS

Machine Translation of JP 2007-069334, which JP '334 was published Mar. 2007.*

*Primary Examiner* — Erica E Cadugan
(74) *Attorney, Agent, or Firm* — McGinn IP Law Group, PLLC

(57) ABSTRACT

The present invention aims to provide a working device for deburring or chamfering easily, for example on the both sides of a gear, and for desired deburring or chamfering effectively on a large-sized gear, and comprises a base stage, a workpiece hold and rotate device mounted thereon for holding and rotating a workpiece, a working device mounted on the base stage and movable to and from the workpiece and having a working tool for working against obverse and reverse sides of the workpiece, a pressing device for pressing the working device toward the workpiece, and a tracing device on the working means, composed of a workpiece obverse side tracing member corresponding to the obverse side of workpiece, and a workpiece reverse side tracing member corresponding to the reverse side of workpiece, for moving the working device in forward and rearward directions by becoming in contact with and tracing shape of the workpiece.

8 Claims, 25 Drawing Sheets

(56) References Cited

U.S. PATENT DOCUMENTS

| | | | | |
|---|---|---|---|---|
| 5,522,684 A | * | 6/1996 | Heck | 409/138 |
| 5,765,975 A | * | 6/1998 | Hoffmann et al. | 409/138 |
| 5,971,680 A | * | 10/1999 | Kuo | 409/138 |
| 6,027,288 A | * | 2/2000 | Senjo | 409/138 |
| 8,118,522 B2 | * | 2/2012 | Nakajima | 409/8 |

FOREIGN PATENT DOCUMENTS

| | | | |
|---|---|---|---|
| JP | 5-200655 | | 8/1993 |
| JP | 5-337716 | | 12/1993 |
| JP | 8-85011 | | 4/1996 |
| JP | 11-197930 | | 7/1999 |
| JP | 2001205521 A | * | 7/2001 |
| JP | 2006167827 A | * | 6/2006 |
| JP | 2007-069317 A | * | 3/2007 |
| JP | 2007-069318 A | * | 3/2007 |
| JP | 2007-069334 A | * | 3/2007 |
| JP | 2010269387 A | * | 12/2010 |
| JP | 2011-016180 A | * | 1/2011 |
| JP | 2012-091262 A | * | 5/2012 |

* cited by examiner

WORKING DEVICE

TECHNICAL FIELD

The present invention relates to a working device which carries out deburring and chamfering against industrial parts having complicated shape such as gears (hereinafter "workpiece"), which have been manufactured by working machine through a process of cutting, die-casting, injection molding, punch pressing, lost-wax, die-forging, etc. In particular, the present invention relates to a working device having advanced performance for easy deburring and chamfering against the outer or inner edge of the both outer and inner sides of workpiece.

BACKGROUND ART

When a workpiece has been manufactured by working machine through a process of cutting, die-casting, injection molding, punch pressing, lost-wax, die-forging, etc., there would remain "burr," namely excessive portions around the outer edge. Thus, the manufacturing of such workpiece would be followed by deburring by using flexible tools such as brushing wheel or wire wheel.

There is also a process called chamfering, which is given against the surface edge of workpiece in accordance with the outer shape of workpiece. Where the end surface of workpiece needs to be finished at a predetermined accuracy, the finish process would be carried out by using end mill, rotary bur, chamfer cutter, etc.

However, such type of machines would move the cutting tool in accordance with trajectory information which had been set by model workpiece, therefore stereotypical cutting pattern would be applied to each workpiece.

When setting the trajectory information, a large number of programming points must be set in accordance with the contour of the model workpiece, and their coordinate axes must be determined, which would require too much labor and long working time.

The applicant of the present invention had already made suggestions and filed patent applications in regard to "tracing working device" disclosed in Patent Document 1 and "working device" disclosed in Patent Document 2 as shown below. According to these previous inventions, it is possible to carry out desired working, without being affected by contour deviation of workpiece, without requiring input and memorizing of complicated trajectory information, at lower cost, and without requiring complicated control operation.

Patent Document 1: Official Gazette of Japanese Unexamined Patent Publication No. Hei 5-200655
Patent Document 2: Official Gazette of Japanese Unexamined Patent Publication No. Hei 11-197930

SUMMARY OF THE INVENTION

Problems to be Solved by Invention

The prior arts as disclosed above have the following problems.

For example, when deburring or chamfering is done against teeth of various gears, it is necessary to carry out on the both side of the gear. When such working is done by any working device according to the prior art, then, after finishing the working on one side of the gear, it is still necessary to turn around the gear and to set again. There have been many demands to improve this situation, because of long working time and much labor.

Some workpieces relate, for example, to large-sized gears incorporated in wind generators, and desired deburring or chamfering needs to be done against such large-sized gears. However, any working device according to the prior art may not accommodate such large-sized gears.

In the light of the above problems as discussed above, it is an object of the present invention to provide a working device, which can carry out deburring or chamfering easily, for example on the both sides of a gear, and which can also carry out desired deburring or chamfering effectively on a large-sized gear.

Means to Solve the Problem

To achieve the objects mentioned above, according to the present invention, there is a working device comprising, a base stage, a workpiece hold and rotate means mounted on the base stage for holding and rotating a workpiece, a working means mounted on the base stage and being movable to be close to and away from the workpiece and provided with a working tool for carrying out a predetermined working against an obverse side and a reverse side of the workpiece, a pressing means for pressing the working means toward the workpiece, and a tracing means provided on the working means, composed of a workpiece obverse side tracing member corresponding to the obverse side of the workpiece, and a workpiece reverse side tracing member corresponding to the reverse side of the workpiece, for moving the working means in forward and rearward directions by becoming in contact with the workpiece and tracing shape of the workpiece.

According to of the present invention, the working means is provided with a workpiece obverse side working tool corresponding to the obverse side of the workpiece, and with a workpiece reverse side working tool corresponding to the reverse side of the workpiece.

According to the present invention, the workpiece obverse side working tool and the workpiece reverse side working tool are separately provided on a common working head, at positions opposite to each other at the angle of 180 degree, and the workpiece obverse side tracing member and the workpiece reverse side tracing member are respectively positioned adjacent to the workpiece obverse side working tool and the workpiece reverse side working tool.

According to of the present invention, the workpiece obverse side working tool and the workpiece reverse side working tool are separately provided on individual working heads provided separately, and the workpiece obverse side tracing member and the workpiece reverse side tracing member are respectively positioned adjacent to the workpiece obverse side working tool and the workpiece reverse side working tool.

According to the present invention, the working means is provided with a single working tool for carrying out a predetermined working against the obverse side and reverse side of the workpiece, and rotation axis of the working tool is orthogonal to rotation axis of the workpiece hold and rotate means, and the workpiece obverse side tracing member and the workpiece reverse side tracing member are positioned opposite to each other by placing the working tool in the middle.

According to the present invention, the base stage is provided with a horizontal slide member being movable to be close to and away from the workpiece, and the horizontal slide member is provided with a vertical slide member being movable in upward and downward directions, and the vertical slide member is provided with another horizontal slide member, and the working means is provided on the other horizontal slide member so that the working means may move along the other horizontal slide member to and from the workpiece.

According to the present invention, the workpiece hold and rotate means is composed of a workpiece upper holding drive roller mechanism provided to be movable, and a plurality of workpiece lower holding roller mechanism provided to be movable.

And according to the present invention, one of the plurality of workpiece lower holding roller mechanism is a workpiece lower holding drive roller mechanism.

Effect of the Invention

As discussed above, according to the present invention, the working device is provided with a base stage, a workpiece hold and rotate means mounted on the base stage for holding and rotating a workpiece, a working means mounted on the base stage and being movable to be close to and away from the workpiece and provided with a working tool for carrying out a predetermined working against an obverse side and a reverse side of the workpiece, a pressing means for pressing the working means toward the workpiece, and a tracing means provided on the working means, composed of a workpiece obverse side tracing member corresponding to the obverse side of the workpiece, and a workpiece reverse side tracing member corresponding to the reverse side of the workpiece, for moving the working means in forward and rearward directions by becoming in contact with the workpiece and tracing shape of the workpiece. Therefore, it is possible to carry out desired working easily on both the obverse and reverse sides of the workpiece.

According to the present invention, the working means is provided with a workpiece obverse side working tool corresponding to the obverse side of the workpiece, and with a workpiece reverse side working tool corresponding to the reverse side of the workpiece. Therefore, it is possible to surely obtain the above effect.

According to the present invention, the workpiece obverse side working tool and the workpiece reverse side working tool are separately provided on a common working head, at positions opposite to each other at the angle of 180 degree, and the workpiece obverse side tracing member and the workpiece reverse side tracing member are respectively positioned adjacent to the workpiece obverse side working tool and the workpiece reverse side working tool. Therefore, because of the common working head, it is possible to surely obtain the above effect by simple structure.

According to the present invention, the workpiece obverse side working tool and the workpiece reverse side working tool are separately provided on individual working heads provided separately, and the workpiece obverse side tracing member and the workpiece reverse side tracing member are respectively positioned adjacent to the workpiece obverse side working tool and the workpiece reverse side working tool. Therefore, because of the individual working heads provided separately, it is possible to carry out the working against both the obverse and reverse sides of the workpiece at the same time, and the time required for working may be reduced.

According to the present invention, the working means is provided with a single working tool for carrying out a predetermined working against the obverse side and reverse side of the workpiece, and rotation axis of the working tool is orthogonal to rotation axis of the workpiece hold and rotate means, and the workpiece obverse side tracing member and the workpiece reverse side tracing member are positioned opposite to each other by placing the working tool in the middle. Therefore, because the common working tool is used for the obverse and reverse sides of the workpiece, the simple structure may be accomplished.

According to the present invention, the base stage is provided with a horizontal slide member being movable to be close to and away from the workpiece, and the horizontal slide member is provided with a vertical slide member being movable in upward and downward directions, and the vertical slide member is provided with another horizontal slide member, and the working means is provided on the other horizontal slide member so that the working means may move along the other horizontal slide member to and from the workpiece. Therefore, it is possible to adjust the positions easily in the horizontal and vertical directions, and easy positioning at a desired position can be carried out.

According to the present invention, the workpiece hold and rotate means is composed of a workpiece upper holding drive roller mechanism provided to be movable, and a plurality of workpiece lower holding roller mechanism provided to be movable. Therefore, it is possible to accommodate, for example a large-sized gear, easily.

And according to the present invention, one of the plurality of workpiece lower holding roller mechanism is a workpiece lower holding drive roller mechanism. Therefore, through cooperative function with the workpiece lower holding drive roller mechanism, it is possible to surely rotate the workpiece.

Figure 1:
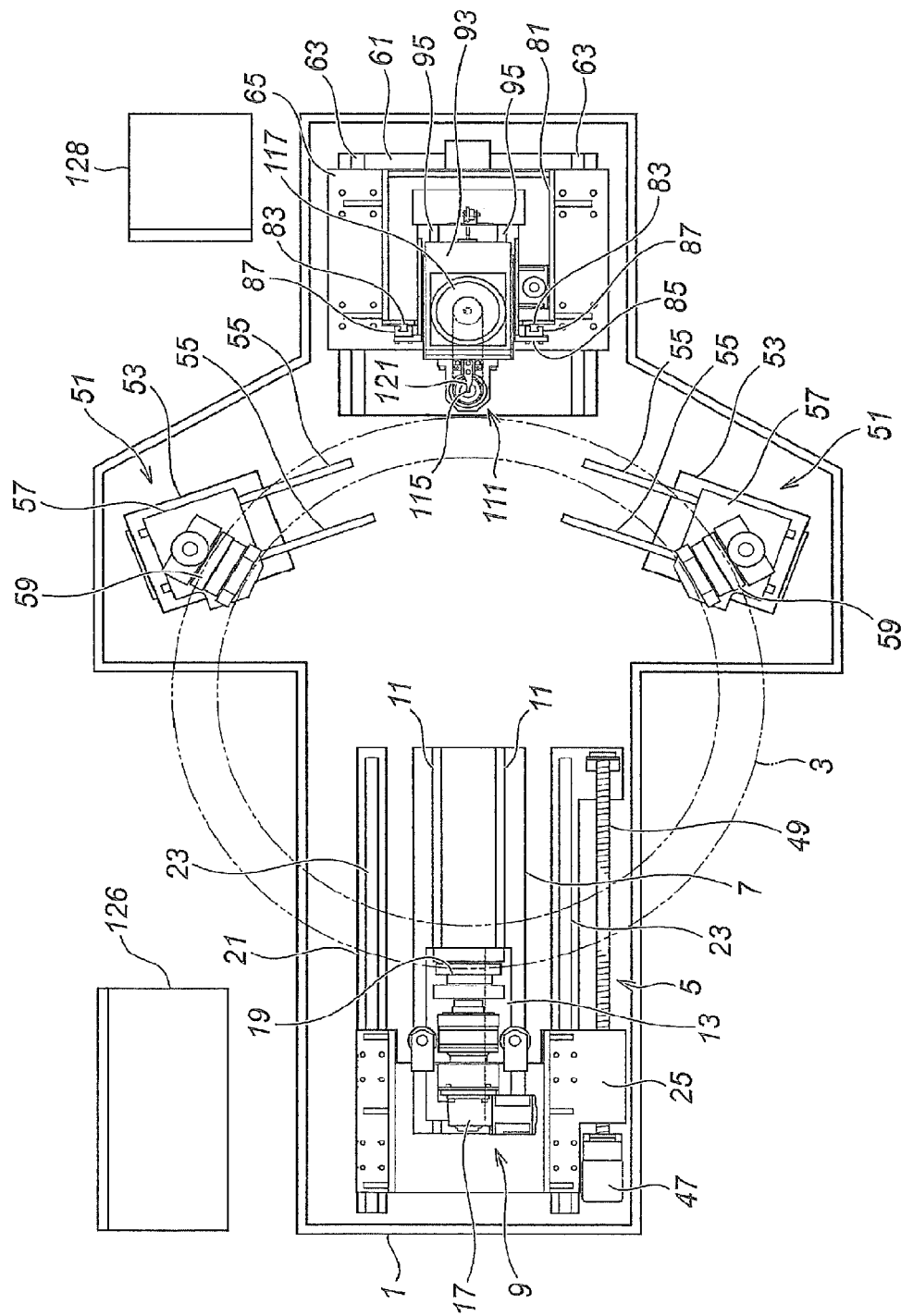
FIG. 1 A plan view showing a structure of a chamfering device, according to a first embodiment of the present invention.

EXPLANATION OF REFERENCE NUMERALS AND SIGNS 1 base stage
3 workpiece
5 workpiece hold and rotate means
9 workpiece lower holding drive roller mechanism
20 workpiece upper holding drive roller mechanism
51 workpiece lower holding roller mechanism
61 base member
65 horizontal slide member
85 vertical slide member
93 horizontal slide member
111 double-side axis spindle chamfering unit
113 upper side working rotary tool
115 lower side working rotary tool
119 upper side working stylus member
121 lower side working stylus member

BEST MODE FOR CARRYING OUT THE INVENTION

A first embodiment of the present invention will now be discussed with reference to FIGS. 1 through 6. The first embodiment shows an example of a working device according to the present invention, by which a work, for example a large-sized gear having external teeth, used for wind generator, is chamfered against the outer peripheral edges of the gear teeth on both the obverse side and the reverse side.

Figure 2:
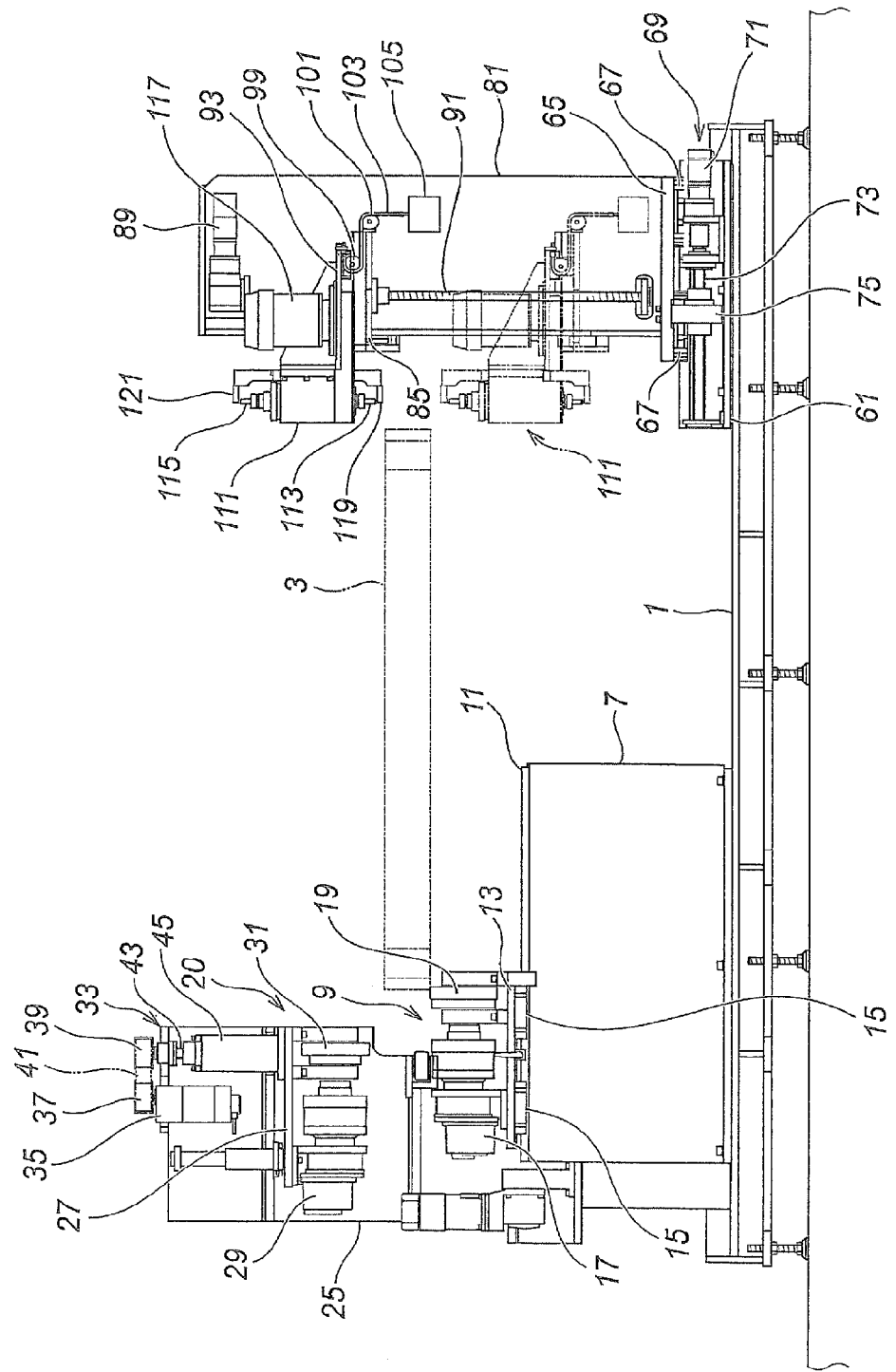
FIG. 2 A side view showing a structure of the chamfering device, according to the first embodiment of the present invention.
Figure 3:
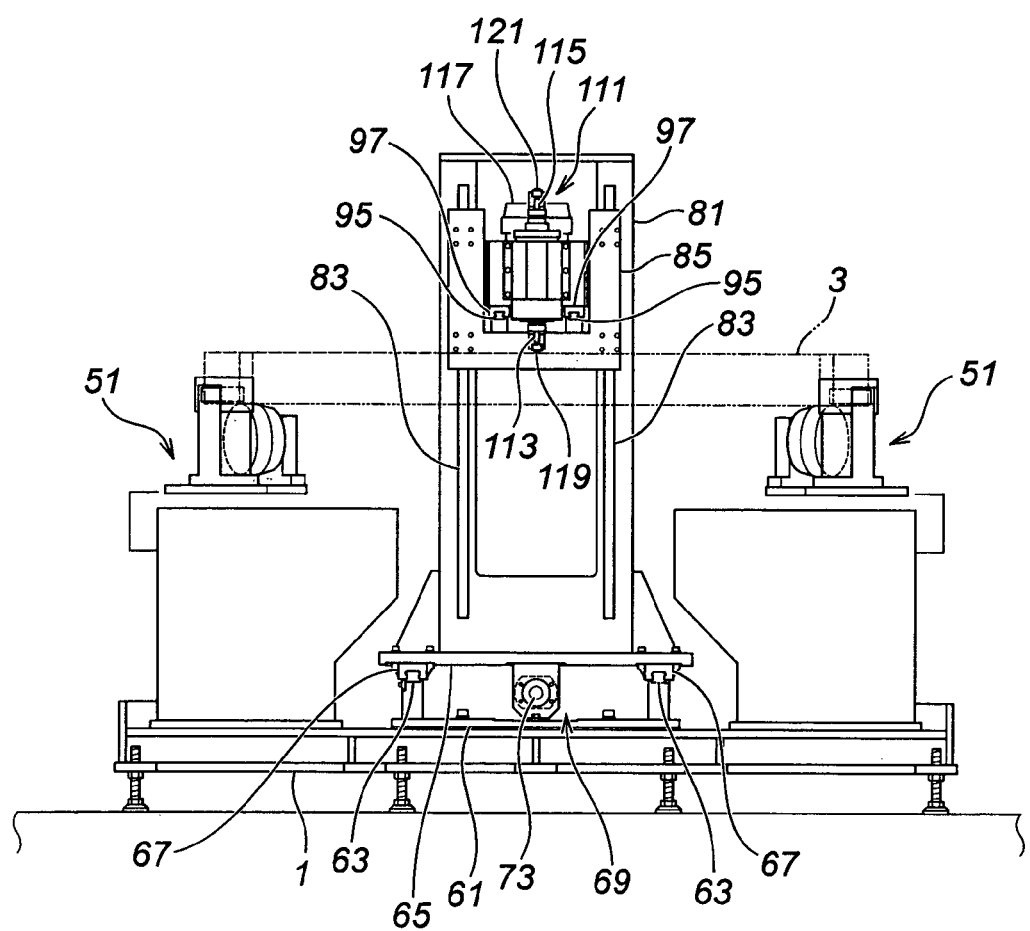
FIG. 3 A front view showing a structure of the chamfering device, according to the first embodiment of the present invention.
Figure 4:
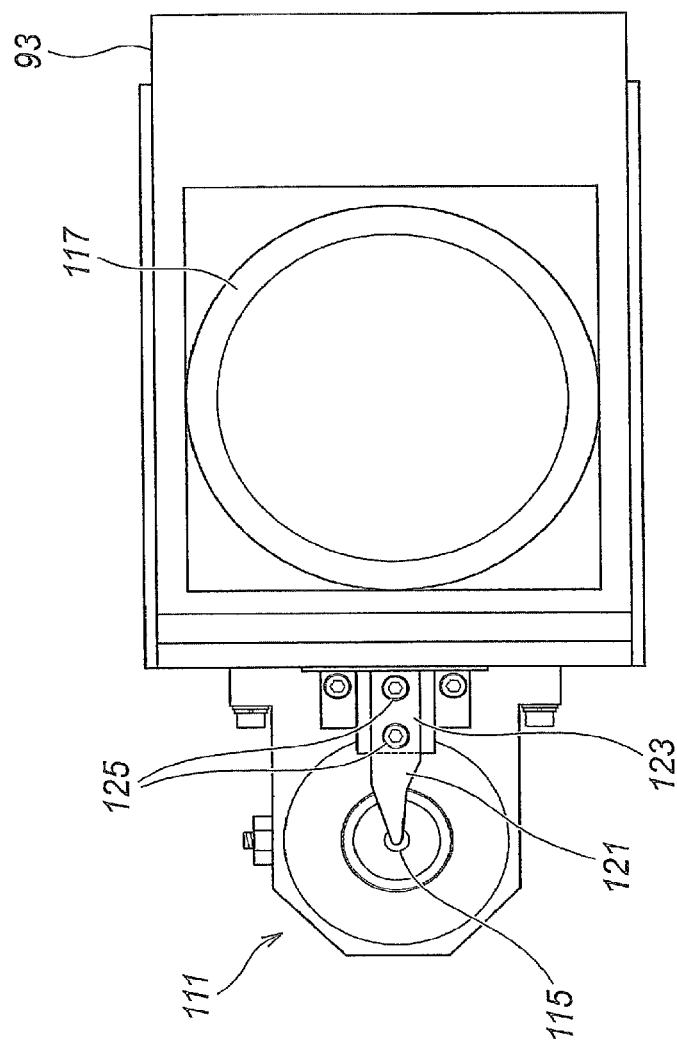
FIG. 4 A plan view showing a structure of a spindle and adjacent elements, according to the first embodiment of the present invention.
Figure 5:
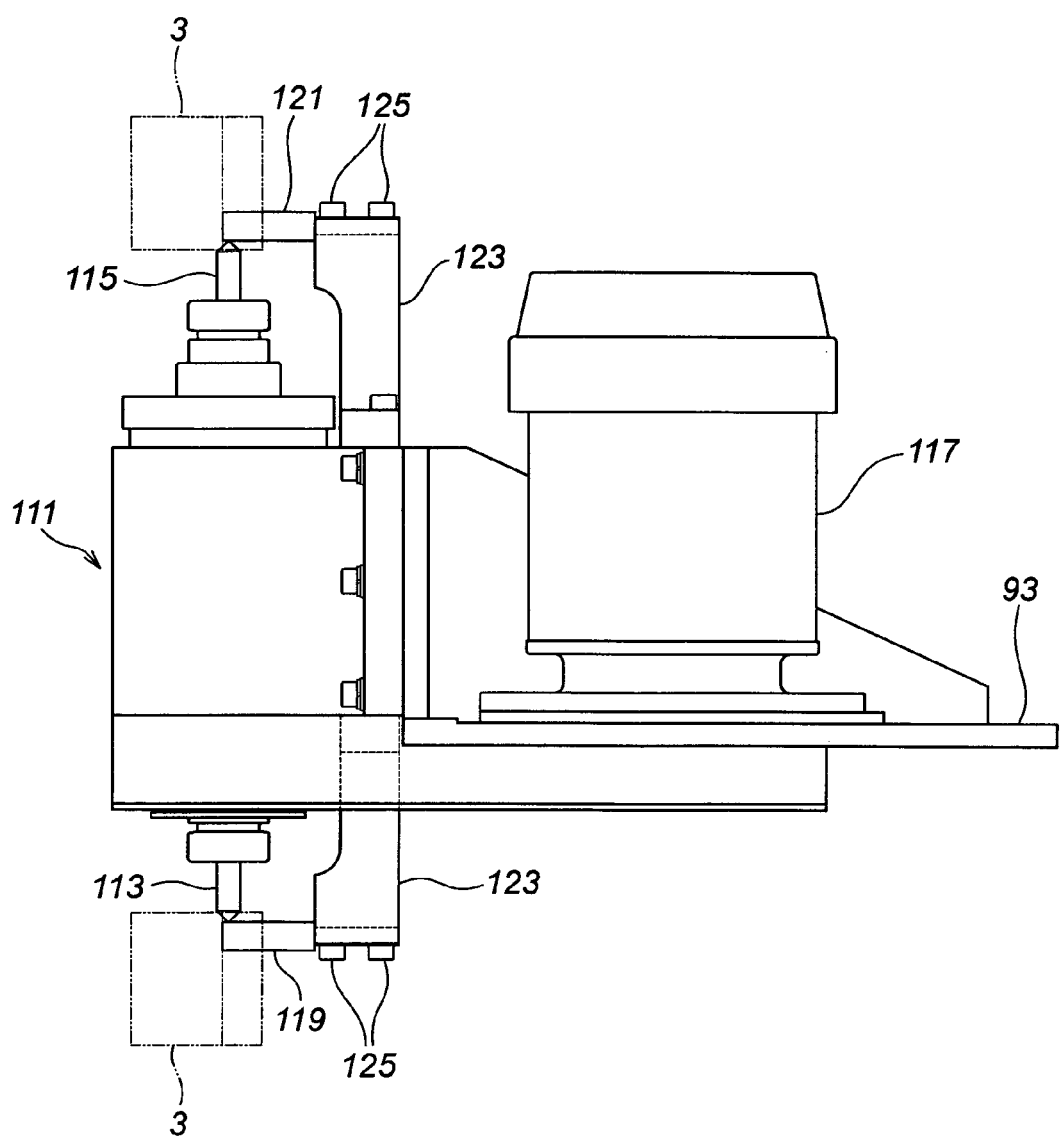
FIG. 5 A side view showing a structure of the spindle and the adjacent elements, according to the first embodiment of the present invention.
Figure 6:
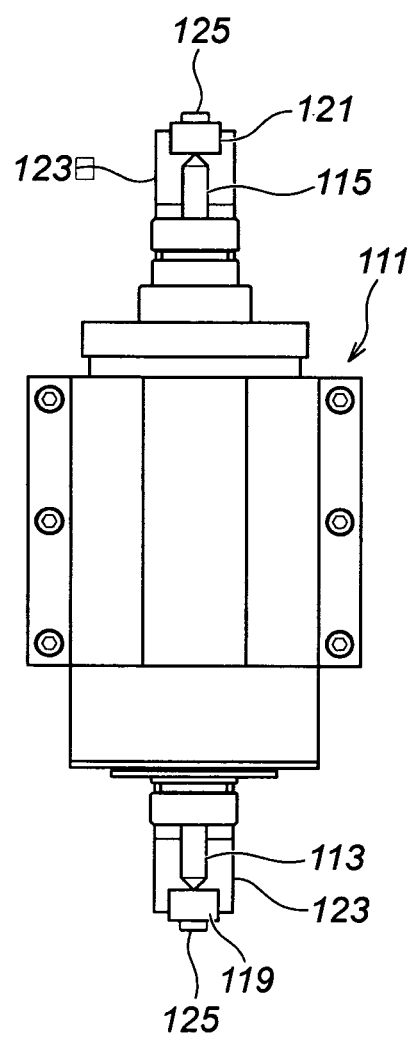
FIG. 6 A front view showing a structure of the spindle and the adjacent elements, according to the first embodiment of the present invention.

As illustrated in FIGS. 1 through 3, there is a base stage 1, and a workpiece hold and rotate means 5 is mounted on the base stage 1. The workpiece hold and rotate means 5 serves for holding and rotating a large-sized gear, namely workpiece 3. The workpiece hold and rotate means 5 has the following structure.

There is a base part 7 mounted on the left side of the base stage 1 as shown in FIGS. 1 and 2, and there is a workpiece lower holding drive roller mechanism 9 provided on the base 7. As illustrated in FIG. 1, there is a pair of guide rails 11, 11 provided on the base 7, and a horizontal slide member 13 is provided on the pair of guide rails 11, 11. The horizontal slide member 13 has two sets of twin guide members 15, 15, each set being provided respectively on the right and left sides of the lower part of the workpiece lower holding drive roller mechanism 9. The two sets of twin guide members 15, 15 on the right and left sides are respectively engaged to be movable along the pair of guide rails 11, 11. Thus the horizontal slide member 13 can be moved to the appropriate position, when being pushed or pulled by manual operation, along the pair of slide rails 11, 11. There is a drive motor 17 mounted on the horizontal slide member 13, and a workpiece lower holding drive roller 19 is fixed on the rotating shaft. This is the structure of the workpiece lower holding drive roller mechanism 9 as discussed above.

There is a workpiece upper holding drive roller mechanism 20 above the workpiece lower holding drive roller mechanism 9, of which structure will be discussed in detail. There is another base 21 in a form of sandwiching the base 7 from both the upper and lower sides of FIG. 1. As illustrated in FIG. 1, there is a pair of guide rails 23, 23 provided on the base 21, and a horizontal slide member 25 is provided to be movable along the pair of guide rails 23, 23. The horizontal slide member 25 has a gate-like shape, which straddles the workpiece lower holding drive roller mechanism 9, as discussed above, in the perpendicular direction of FIG. 1 The horizontal slide member 25 has unillustrated two sets of twin guide members on the right and left sides of the lower part, and these two sets of twin guide members are respectively engaged to be movable with the pair of guide rails 23, 23.

As illustrated in FIG. 2, there is a vertical slide member 27 to be movable in upper and lower directions, mounted on the horizontal slide member 25. There is a drive motor 29 mounted on the lower part of the vertical slide member 27. There is a workpiece upper holding drive roller 31 fixed on the rotating shaft of the drive motor 29. The vertical slide member 27 is movable in upper and lower directions by a vertical slider mechanism 33. The vertical slider mechanism 33 has a drive motor 35, pulleys 37, 39, a belt 41, a ball screw 43, and a vertical slider 45 being positioned and engaged to be movable with the ball screw 43. The vertical slide member 27 as discussed above is attached to this vertical slider 45. When the drive motor 35 rotates, the vertical slide member 27 goes down via the vertical slider 45, whereby the workpiece upper holding drive roller 31 holds the workpiece 3 from the upper side.

The movement of the horizontal slide member 25 is carried out by a drive motor 47, a ball screw 49 connected to the drive motor 47, and an unillustrated ball nut being positioned to be engaged with the ball screw 49 and also being fixed on the horizontal slide member 25. When the drive motor 47 rotates, the horizontal slide member, 25 moves in the right and left directions of FIGS. 1 and 2, along the pair of guide rails 23, 23.

As illustrated in FIGS. 1 and 3, there are two sets of workpiece lower holding roller mechanism 51, 51, separately from the workpiece lower holding drive roller mechanism 9 as discussed above. The structure of the workpiece lower holding roller mechanism 51 will be discussed as below. There is a base 53, and a pair of guide rails 55, 55 is provided on the base 53. There is a horizontal slide member 57 provided to be slidable along the pair of guide rails 55, 55. The horizontal slide member 57 has unillustrated two sets of twin guide members on the right and left sides of the reverse surface, and these two sets of twin guide members are respectively engaged to be movable with the pair of guide rails 55, 55. Thus the horizontal slide member 57 can be moved to the appropriate position, when being pushed or pulled by manual operation, along the pair of guide rails 55, 55. There is a workpiece lower holding roller 59 mounted on the horizontal slide member 57.

Each of the two sets of workpiece lower holding roller mechanism 51, 51 has substantially the same structure, and the same numerals have been allotted to the same parts in the drawings.

Thus the workpiece lower holding drive roller 19 of the workpiece lower holding drive roller mechanism 9, as well as the two sets of workpiece lower holding roller 59, 59, hold the bottom surface of the workpiece 3.

As illustrated in the right side of FIGS. 1 and 2, there is a base 61 mounted on the base stage 1, and a pair of guide rails 63, 63 is provided on the base 61. There is a horizontal slide member 65 provided to be slidable along the pair of guide rails 63, 63. The horizontal slide member 65 has two sets of twin guide members 67, 67, each set being provided respectively on the right and left sides of the lower part of the horizontal slide member 65. There is a drive mechanism 69, mounted on the base 61, at the position between the pair of guide rails 63, 63. The drive mechanism 69 has a drive motor 71, a ball screw 73 connected to the drive motor 71, and a ball nut 75 being positioned and engaged with the ball screw 73. The horizontal slide member 65 as discussed above is fixed by this ball nut 75. Accordingly, when the drive motor 71 rotates in an appropriate desired direction, the horizontal slide member 65 moves in the right and left directions as shown in FIGS. 1 and 2.

There is a support frame 81 standing on the horizontal slide member 65, and there is a pair of guide rails 83, 83, elongating in the perpendicular direction of the drawing, provided on the surface of the support frame 81 facing to the workpiece 3. There is also a vertical slide member 85 mounted on the front side of the pair of guide rails 83, 83. The vertical slide member 85 has two sets of twin guide members 87, 87 on the right and left sides, and these two sets of twin guide members 87, 87 are respectively engaged to be movable with the pair of guide rails 83, 83. There is a drive motor 89, and a ball screw 91 is driven by the drive motor 89. There is also an unillustrated ball nut, being positioned to be engaged with the ball screw 91. The ball nut is fixed on the vertical slide member 85 as discussed above. Thus, when the drive motor 89 rotates, the vertical slide member 85 moves in upward and downward directions of the drawing.

There is another horizontal slide member 93 mounted on the vertical slide member 85. The vertical slide member 85 has a pair of guide rails 95, 95, and the horizontal slide member 93 has two sets of twin guide members 97, 97 on the right and left sides. The two sets of twin guide members 97, 97 are respectively engaged to be movable with the pair of guide rails 95, 95. There is a weight 105, provided between the vertical slide member 85 and the horizontal slide member 93, via rotating bodies 99, 101 and a chain 103. The weight 105 applies the permanent force to the horizontal slide member 93, in a direction toward the workpiece 3 at the front thereof.

There is a double-side axis spindle chamfering unit 111, at the front of the horizontal slide member 93. The double-side axis spindle chamfering unit 111 has an upper side working rotary tool 113 and a lower side working rotary tool 115, and a drive motor 117 drives both the upper side working rotary tool 113 and the lower side working rotary tool 115. There is an upper side working stylus 119, and also a lower side working stylus 121, respectively provided in the vicinity of the upper side working rotary tool 113 and the lower side working rotary tool 115. The upper side working stylus 119 and the lower side working stylus 121 are respectively attached to mounting stages 123 and fixed by fixing screws 125.

With reference to FIG. 1, numeral 126 shows a control board, and numeral 128 shows an operating board.

The function of the present invention will now be explained on the basis of the structure as discussed above.

First, the workpiece 3 is placed on the workpiece lower holding drive roller 19 as well as on the two sets of workpiece lower holding roller 59, 59. At that time, each movement of the horizontal slide member 13 of the workpiece lower holding drive roller mechanism 9, and that of the horizontal slide members 57, 57 of the two sets of workpiece lower holding roller mechanism 51, 51, is done by manual operation.

Thereafter, the workpiece upper holding drive roller 31 presses and holds the workpiece 3 from the upper side.

On the other hand, the drive mechanism 69 is activated, and the horizontal slide member 65 moves toward the workpiece 3, whereby the upper side working rotary tool 113 becomes in contact with the upper edge of the workpiece 3.

In such a state, the workpiece lower holding drive roller 19 and the workpiece upper holding drive roller 31 are activated in order to rotate the workpiece 3. At that time, the upper side working rotary tool 113 also rotates. Thus the chamfering is carried out against the upper edge of the workpiece 3.

When the upper side working rotary tool 113 finishes a predetermined volume of cutting against the upper edge of the workpiece 3, then the upper side working stylus 119 becomes in contact with the outer peripheral surface of the workpiece 3, whereby further cutting by the upper side working rotary tool 113 is prohibited. Such function is applied to the whole circumference of the workpiece 3, and thus the constant volume of chamfering is applied against the upper edge of the workpiece 3.

Thereafter, the chamfering is applied against the lower edge of the workpiece 3. In this situation, the drive motor 89 is activated in order to move the vertical slide member 85 in the downward direction, whereby the double-side axis spindle chamfering unit 111, which has been placed at the position shown by solid lines of FIG. 2, is moved to the position shown by imaginary lines. Accordingly, the chamfering against the lower edge by the lower side working rotary tool 115 becomes ready for action.

Then, in accordance with the same function as that discussed above, a predetermined chamfering is carried out against the lower edge of the workpiece 3.

The present embodiment has the following merits.

First, it is possible to carry out chamfering against both the upper edge and the lower edge of the workpiece 3 easily. This is done by the structure that, because of adopting the double-side axis spindle chamfering unit 111, by simply sliding this double-axis spindle chamfering unit 111 in the upward or downward direction in order to set at an appropriate position, the chamfering against both the upper edge and the lower edge of the workpiece 3 can be carried out.

Further, although the workpiece 3 according to the present embodiment is the large-sized gear, the present embodiment may accommodate such a large-sized gear 3 easily. It is because of the structure that, in particular, there are the workpiece lower holding drive roller mechanism 9, and the two sets of workpiece lower holding roller mechanism 51, 51, respectively provided to be movable, whereby the large-sized gear 3 may be accommodated and held easily, and also because of the structure that, both the workpiece lower holding drive roller mechanism 9 and the workpiece upper holding drive roller mechanism 20 serve to rotate the workpiece 3.

A second embodiment of the present invention will now be discussed with reference to FIGS. 7 through 9. In the first embodiment as explained above, a large-sized gear having external teeth is used as an example of the workpiece 3, and the predetermined chamfering is carried out against both the upper outer edge and lower outer edge of such gear 3. On the other hand, according to the second embodiment, a gear having internal teeth is used as an example, and a predetermined chamfering is carried out against both the upper inner edge and the lower inner edge thereof.

Figure 7:
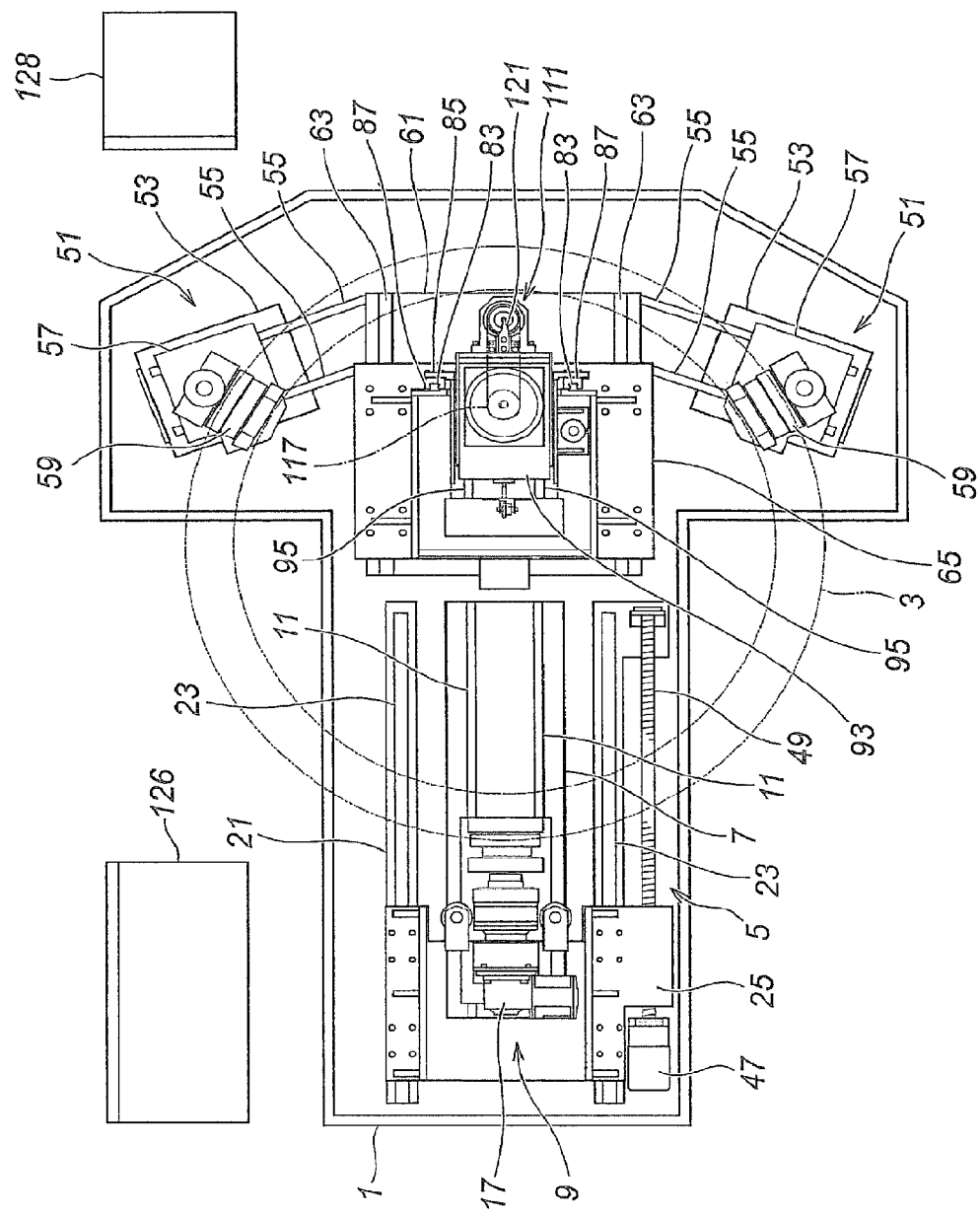
FIG. 7 A plan view showing a structure of a chamfering device, according to a second embodiment of the present invention.
Figure 8:
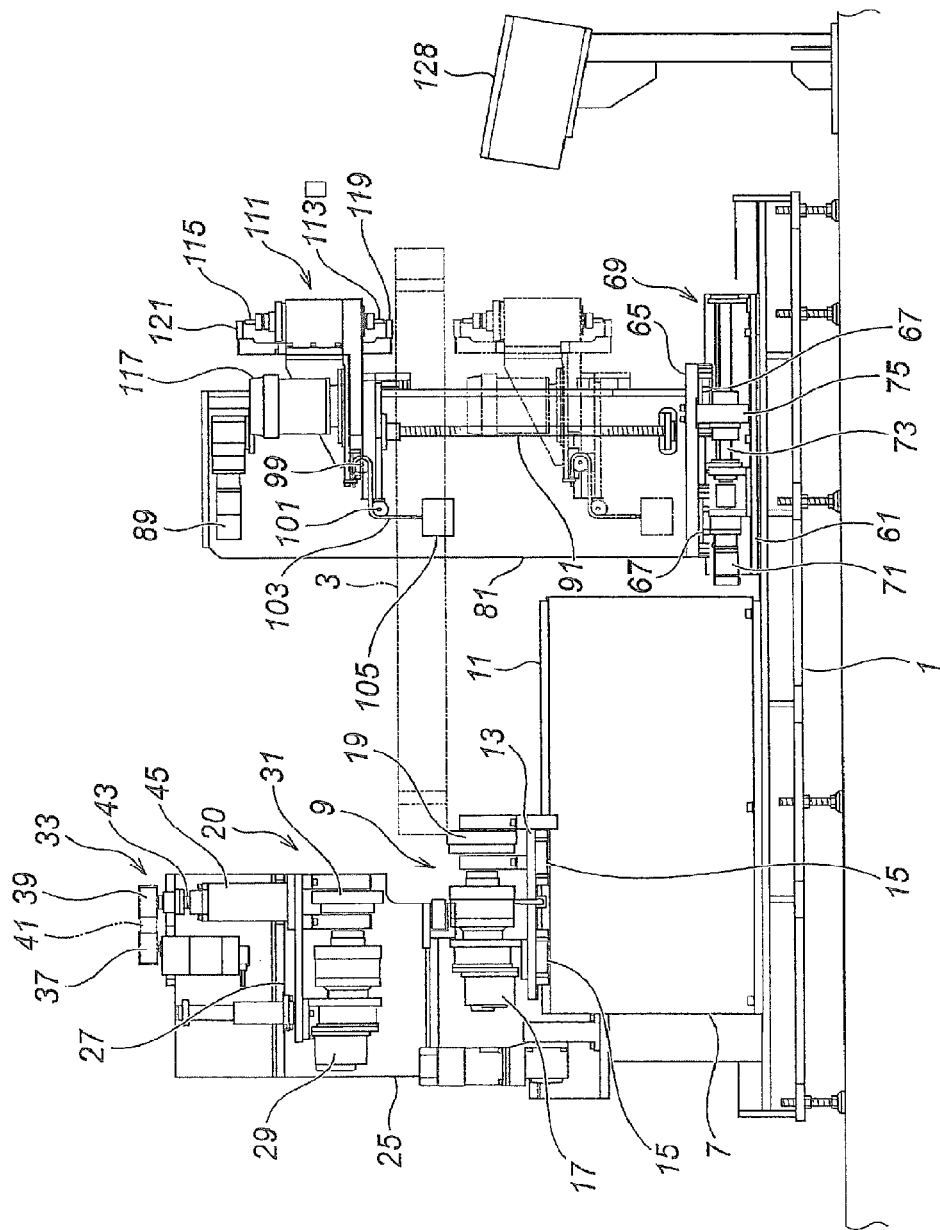
FIG. 8 A side view showing a structure of the chamfering device, according to the second embodiment of the present invention.
Figure 9:
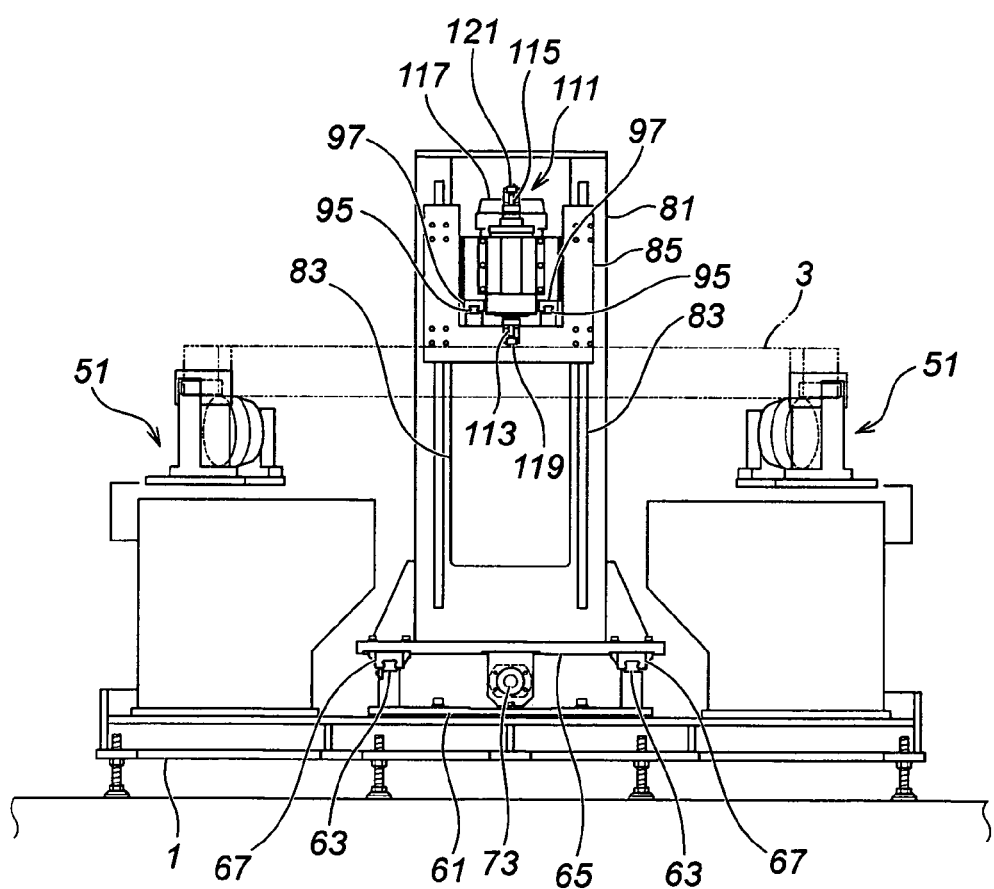
FIG. 9 A front view showing a structure of the chamfering device, according to the second embodiment of the present invention.
Figure 10:
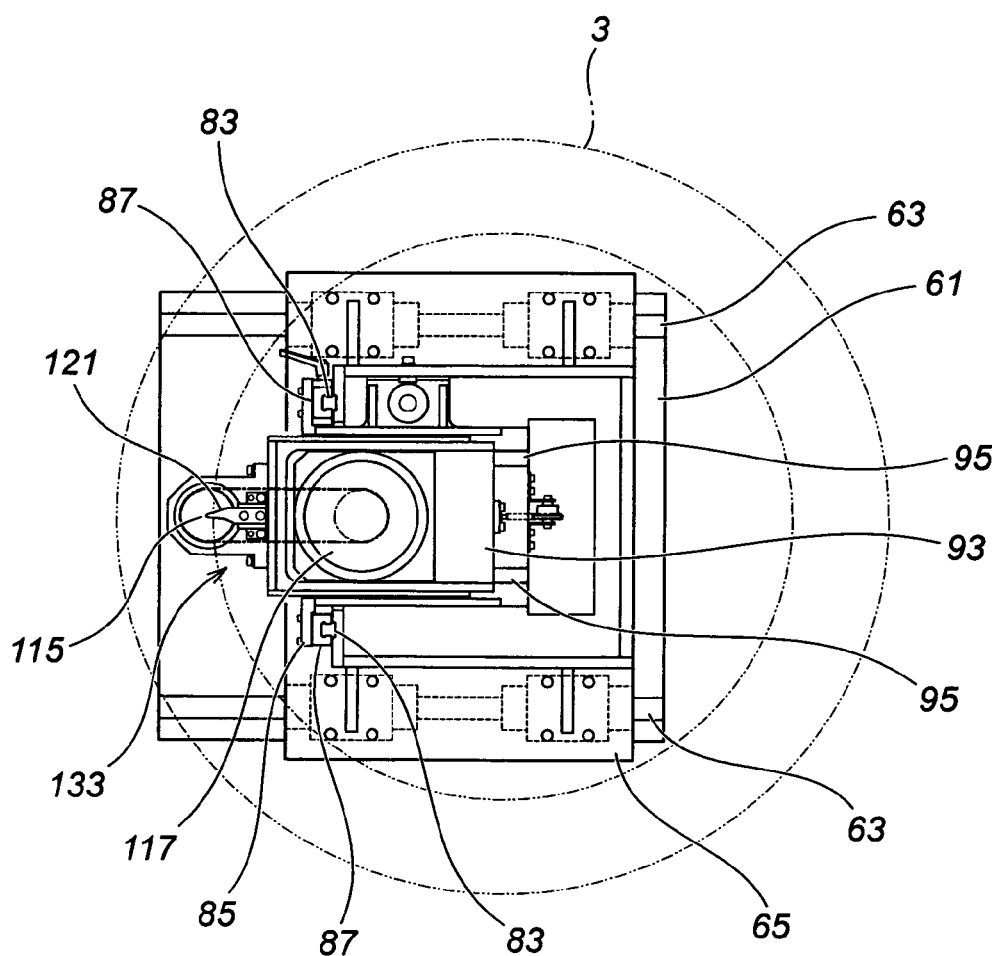
FIG. 10 A plan view showing a structure of a part of a chamfering device, according to a third embodiment of the present invention.

As illustrated in FIGS. 7 and 8, the horizontal slide member 65, the drive mechanism 69, the support frame 81, the vertical slide member 85, and the horizontal slide member 93, are all facing in the opposite directions to those of the first embodiment as shown in FIGS. 1 and 2. These elements are positioned inside the workpiece 3, which is the large-sized gear having internal teeth. Thus the predetermined chamfering may be carried out against both the upper inner edge and the lower inner edge of the large-sized gear 3 having internal teeth.

For reference, the same numerals have been allotted to the same parts in the drawings, as those of the first embodiment.

With this structure, it is possible to express substantially the same effect as that of the first embodiment. Further, the predetermined chamfering may be carried out effectively against the large-sized gear 3 having internal teeth.

A third embodiment of the present invention will now be discussed with reference to FIGS. 10 through 19. In the first and second embodiment as explained above, the double-side axis spindle chamfering unit 111 is used as an example, and by moving the double-axis spindle chamfering unit 111 in the upward or downward direction appropriately, the predetermined volume of chamfering is carried out on the upper edge and the lower edge of the outer or inner peripheral surface of the workpiece 3. On the other hand, according to the third embodiment, a spindle for the upper side, and another spindle for the lower side, are provided separately, whereby a predetermined volume of chamfering against both the upper edge and the lower edge of the workpiece 3 may be carried out at the same time. The structure thereof will be discussed as below.

There are two sets of vertical slide member 85 and the accompanying elements as explained in the first and second embodiments. For example, as illustrated in FIGS. 15 and 16, there is an upper side working spindle chamfering unit 131 mounted on the vertical slide member 85 positioned on the upper side of the drawings, and there is also a lower side working spindle chamfering unit 133 mounted on the vertical slide member 85 positioned on the lower side of the drawings.

Figure 14:
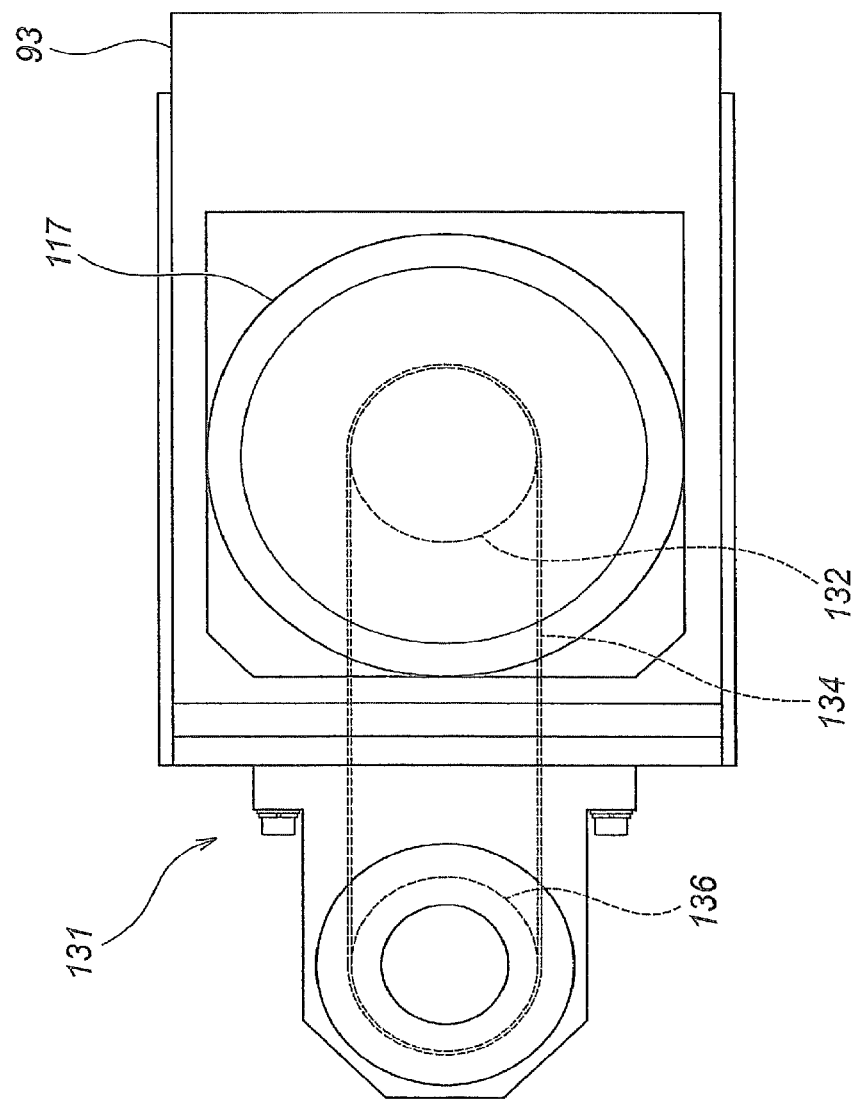
FIG. 14 A plan view showing a structure of a spindle and adjacent elements, according to the third embodiment of the present invention.
Figure 15:
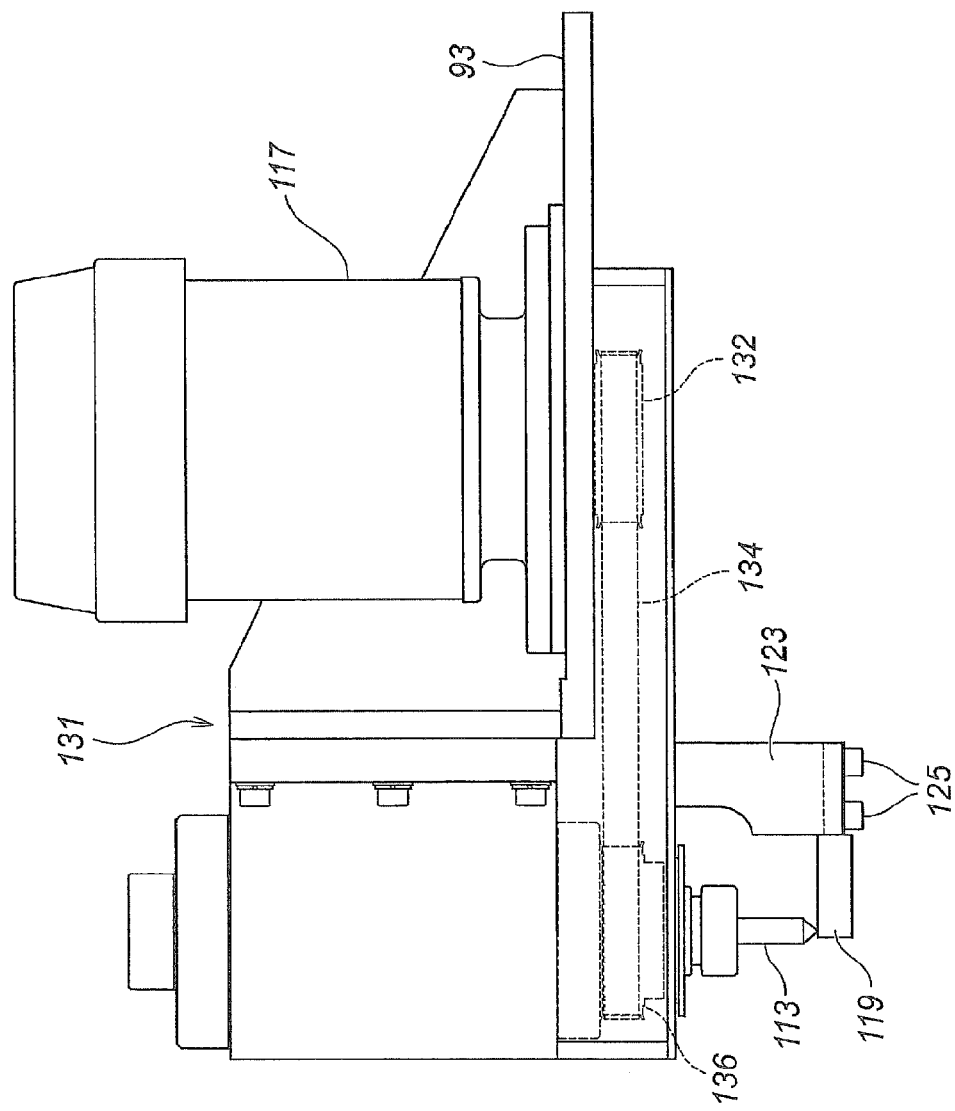
FIG. 15 A side view showing a structure of the spindle and the adjacent elements, according to the third embodiment of the present invention.
Figure 16:
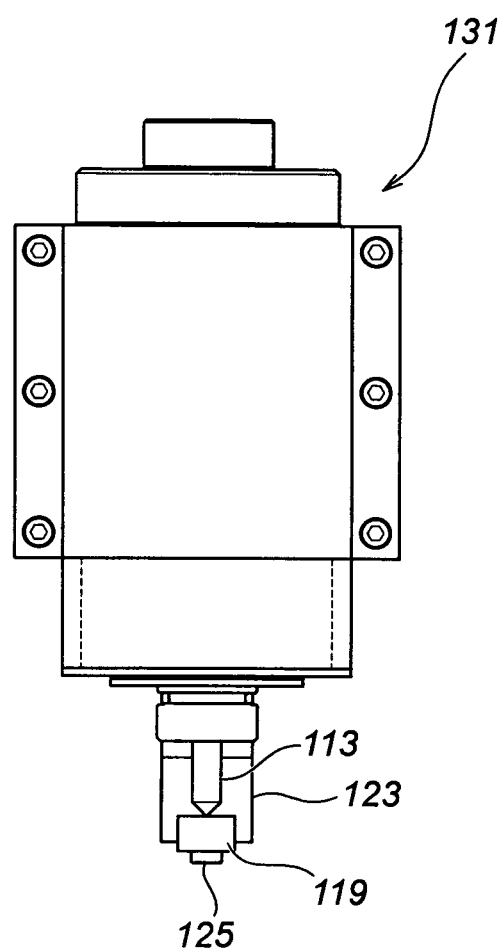
FIG. 16 A front view showing a structure of the spindle and the adjacent elements, according to the third embodiment of the present invention.
Figure 17:
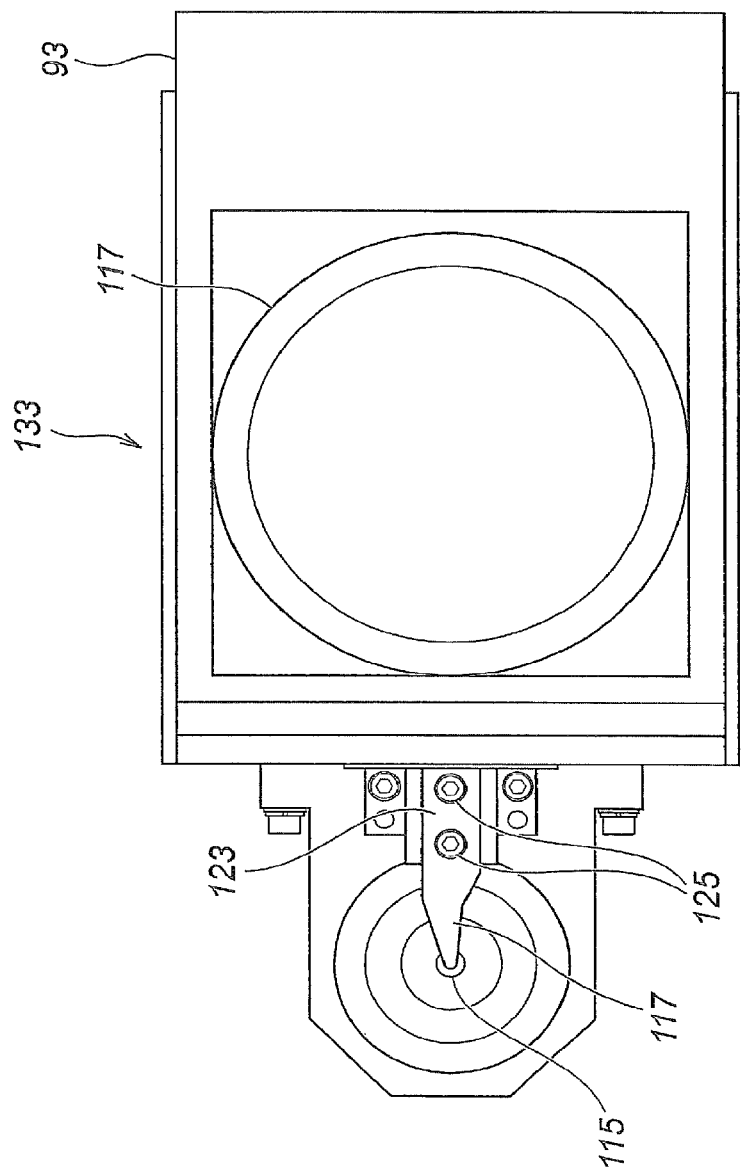
FIG. 17 A plan view showing a structure of a spindle and adjacent elements, according to the third embodiment of the present invention.
Figure 18:
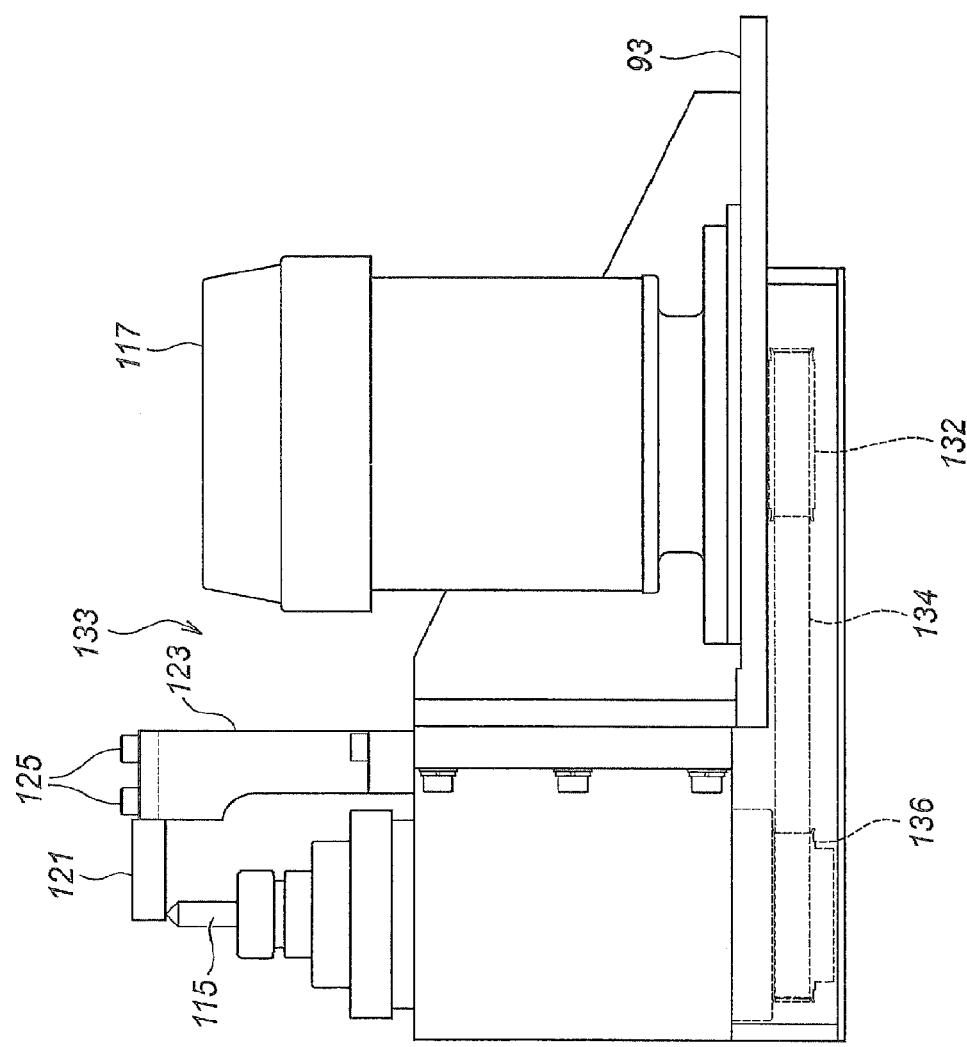
FIG. 18 A side view showing a structure of the spindle and the adjacent elements, according to the third embodiment of the present invention.
Figure 19:
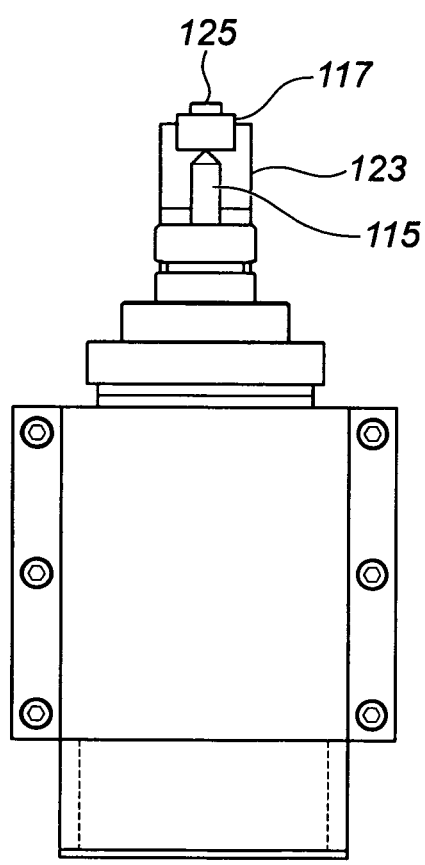
FIG. 19 A front view showing a structure of the spindle and the adjacent elements, according to the third embodiment of the present invention.
Figure 20:
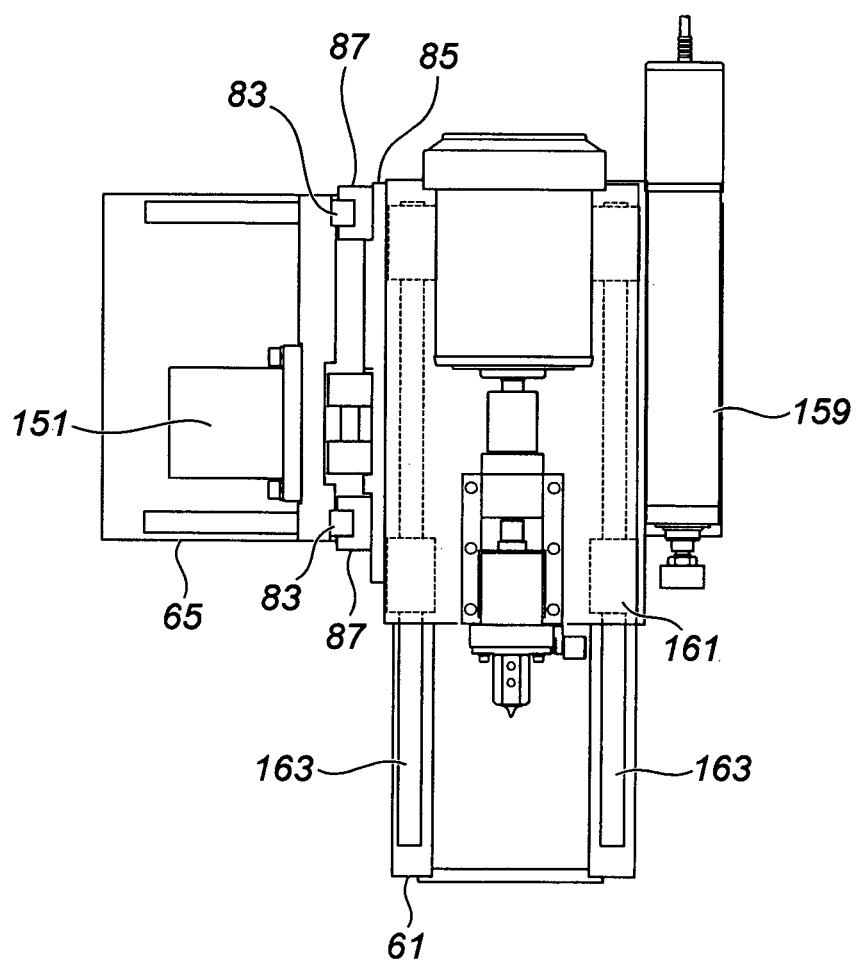
FIG. 20 A plan view showing a structure of a part of a chamfering device, according to a fourth embodiment of the present invention.
Figure 21:
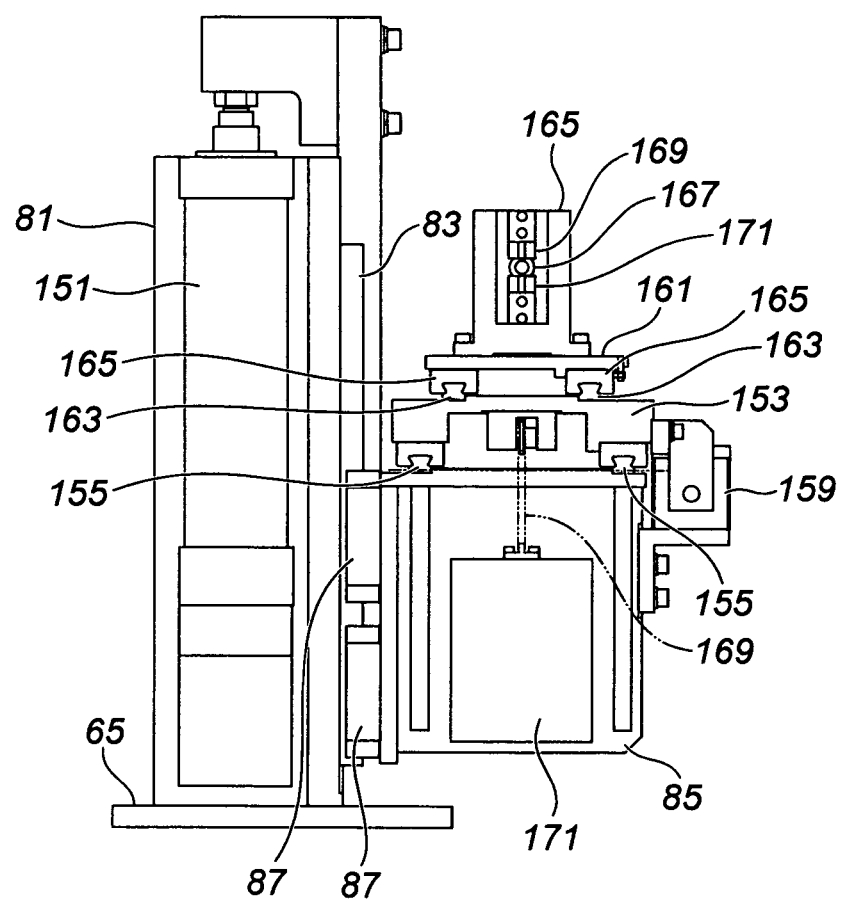
FIG. 21 A front view showing a structure of the part of the chamfering device, according to the fourth embodiment of the present invention.
Figure 22:
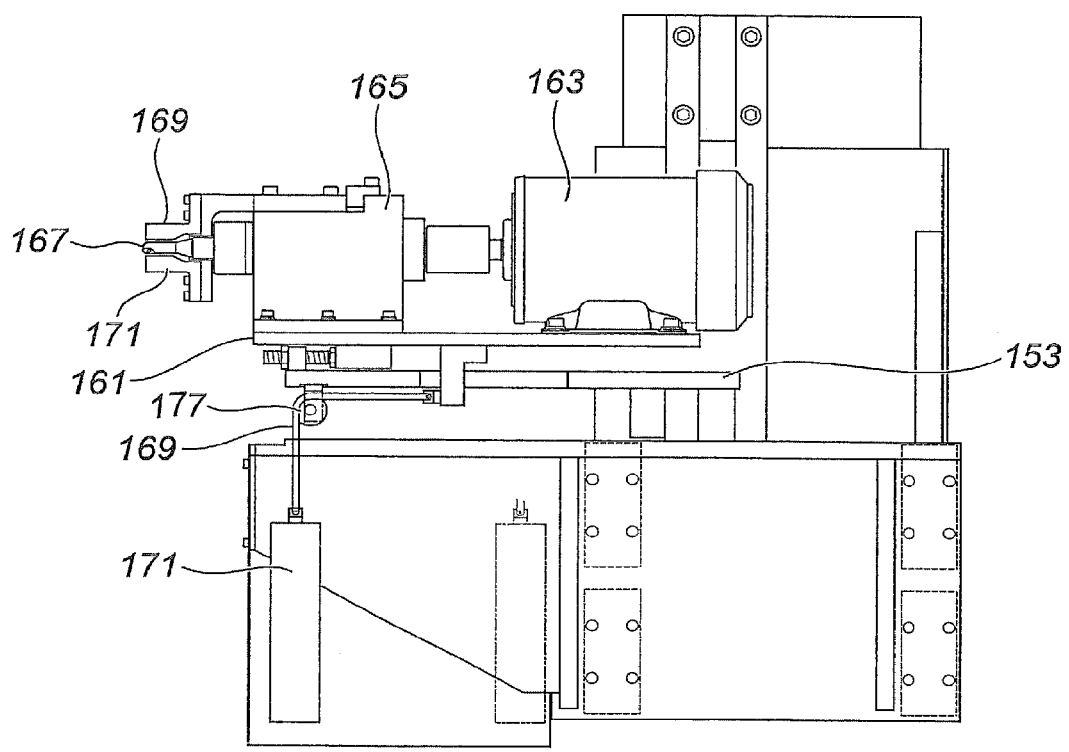
FIG. 22 A side view showing a structure of the part of the chamfering device, according to the fourth embodiment of the present invention.
Figure 23:
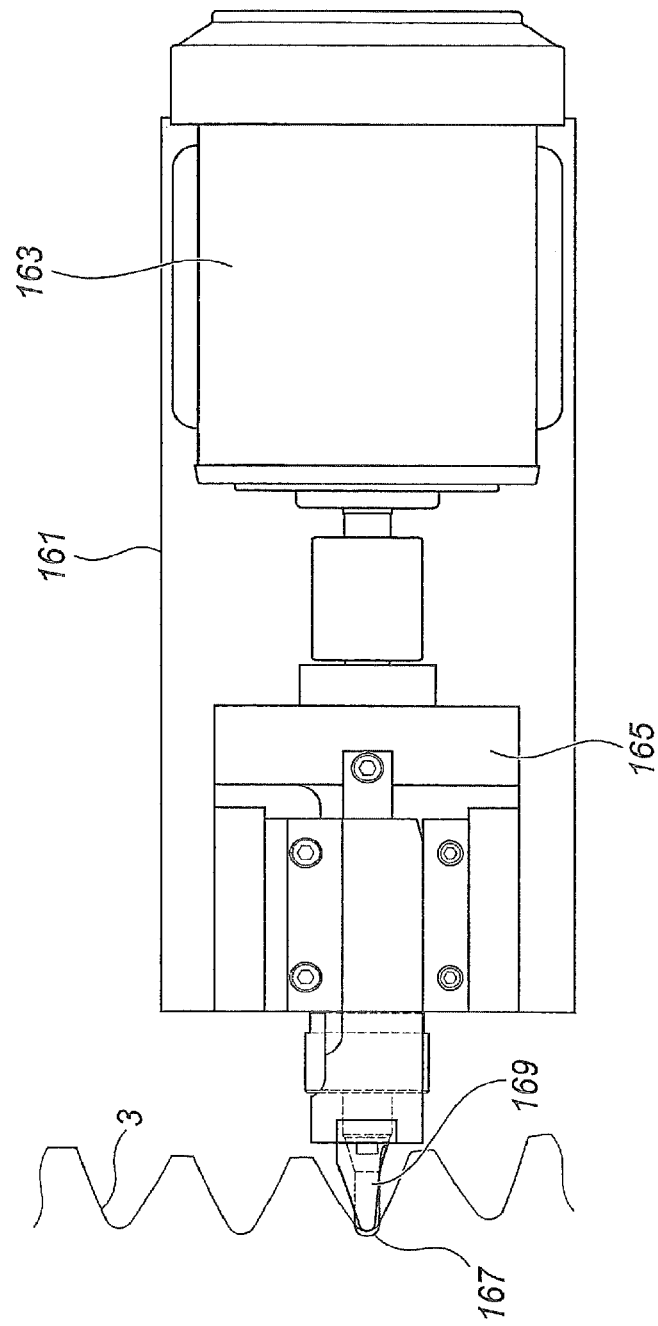
FIG. 23 A plan view showing a structure of a spindle and adjacent elements, according to the fourth embodiment of the present invention.

As illustrated in FIGS. 14 through 16, the upper side working spindle unit 131 is provided with an upper side working rotary tool 113 and an upper side working stylus 119 on the bottom thereof. Also, as illustrated in FIGS. 17 through 19, the lower side working spindle unit 133 is provided with a lower side working rotary tool 115 and a lower side working stylus 121. The upper side working spindle 131 is driven by the drive motor 117, via a pulley 132, a belt 134 and a pulley 136. The substantially same structure is applied to the lower side working spindle 133.

Each of the two sets of vertical slide member 85, 85 respectively has an unillustrated ball nut fixed thereon, and these unillustrated ball nuts are positioned to be engaged with the ball screw 91. The thread of each of the unillustrated ball nuts has been formed in the opposite thread direction, and when the ball screw 91 rotates in an appropriate direction, the both ball nuts, and the pair of vertical slide member 85, 85, as well as both the upper side working spindle unit 131 and the lower side working spindle unit 133, may move to be close to, or apart from, each other.

The other structure is substantially the same as that of the second embodiment, and the same numerals have been allotted to the same parts of the drawings.

Accordingly, in addition to the substantially same effect as that of the first and second embodiments, because the upper side spindle and the lower side spindle have been provided, so that the predetermined volume of chamfering may be carried out against both the upper edge and the lower edge of the workpiece 3 at the same time, it is possible to reduce time required for chamfering.

Figure 11:
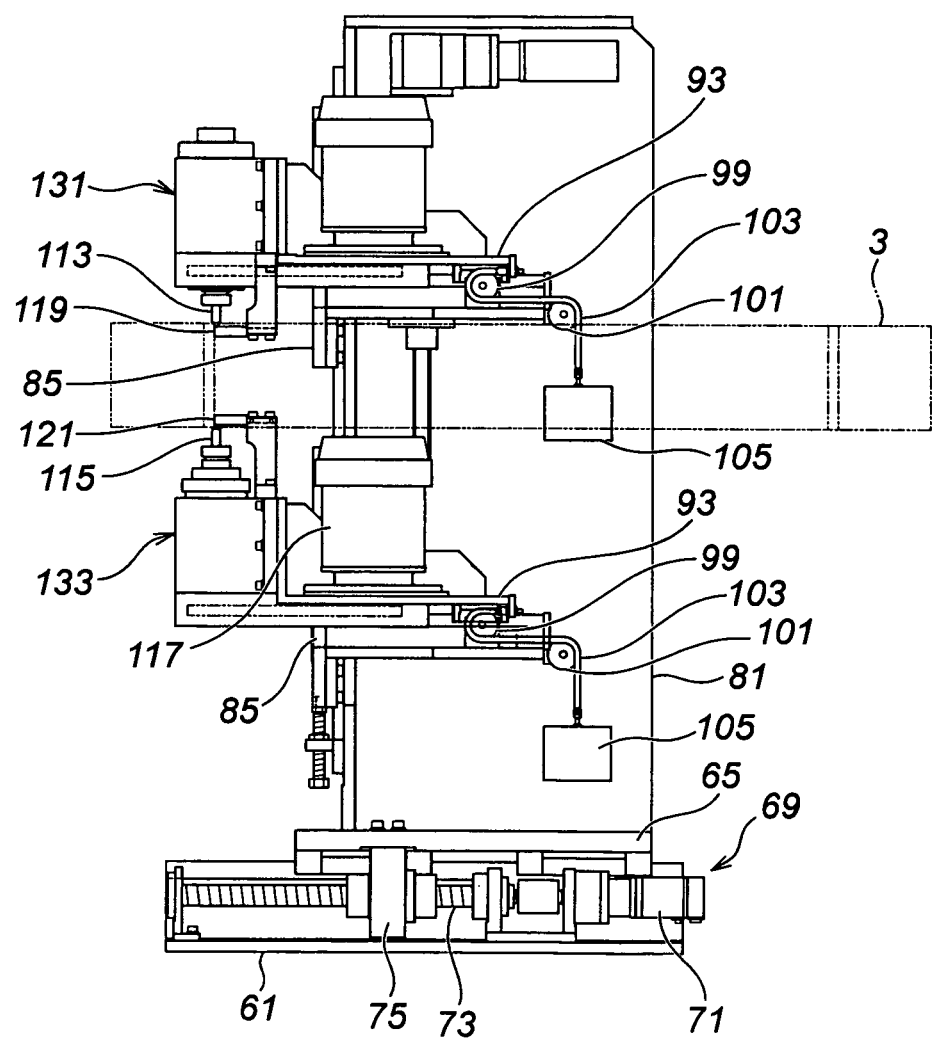
FIG. 11 A side view showing a structure of the part of the chamfering device, according to the third embodiment of the present invention.
Figure 12:
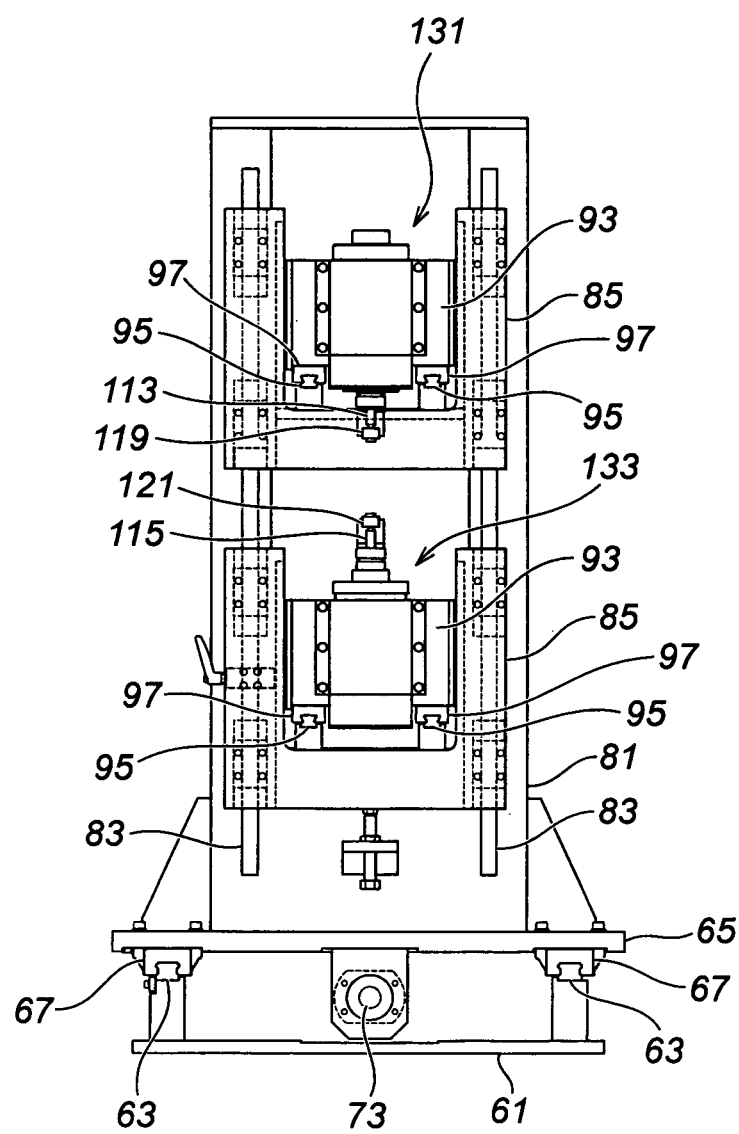
FIG. 12 A front view showing a structure of the part of the chamfering device, according to the third embodiment of the present invention.
Figure 13:
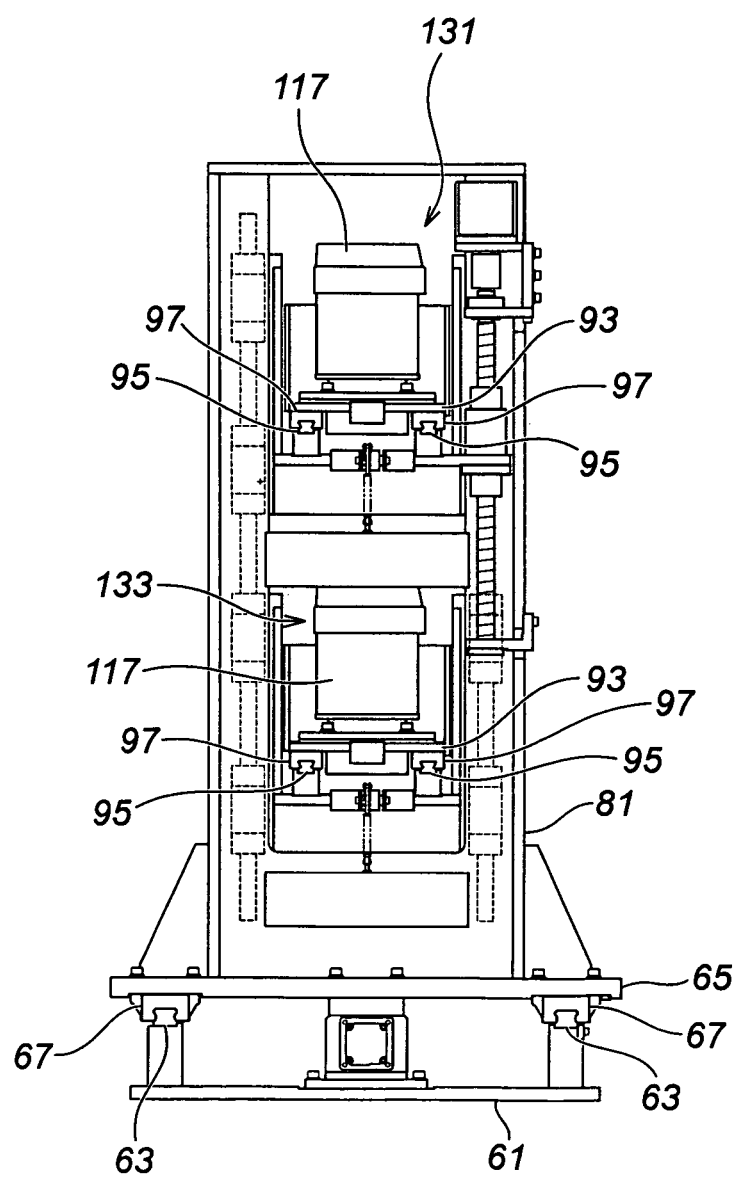
FIG. 13 A rear view showing a structure of the part of the chamfering device, according to the third embodiment of the present invention.

The working status is shown in FIG. 11. The upper side working rotary tool 113 and the upper side working stylus 119, attached to the upper side working spindle unit 131, carry out chamfering against the upper edge of the inner peripheral surface of the workpiece 3, and at the same time, the lower side working rotary tool 115 and the lower side working stylus 121, attached to the lower side working spindle unit 133, carry out chamfering against the lower edge of the inner peripheral surface of the workpiece 3.

Now a fourth embodiment of the present invention will be discussed with reference to FIGS. 20 through 25. According to the first, second and the third embodiments, the chamfering is carried out in a form that the rotation axis of the rotary tool is parallel to the rotation axis of the workpiece 3. On the other hand, according to the fourth embodiment, the rotation axis of rotary tool is orthogonal to the rotation axis of the workpiece 3. The structure will be explained in detail as below.

There is the pair of guide rails 83, 83, provided along the support frame 81 standing on the slide member 65 as discussed in the first, second and third embodiments. On the other hand, the vertical slide member 85 is provided in a movable state. The vertical slide member 85 has the two sets of twin guide members 87, 87, each set respectively being engaged to be movable with the guide rails 83, 83. This structure is substantially the same as that of the first through third embodiments.

The vertical slide member 85 is connected to a vertical motion actuator 151, whereby the vertical motion actuator move the vertical slide member 85 in the upward and downward directions.

There is a horizontal slide member 153 provided to be movable along the vertical slide member 85 as discussed above. The vertical slide member 85 has a pair of guide rails 155, 155. On the other hand, the horizontal slide member 153 is provided with two sets of twin guide members 157, 157 on the right and left sides thereof. These two sets of twin guide members 157, 157 on the right and left sides are respectively engaged to be movable with the pair of the guide rails 155, 155. The horizontal slide member 153 is connected to a forward-rearward motion actuator 159. When this forward-rearward motion actuator 159 is activated, the horizontal slide member 153 moves in forward and rearward directions.

The horizontal slide member 153 is provided with another slidable horizontal slide member 161. The horizontal slide member 153 has a pair of guide rails 163, 163. On the other hand, the horizontal slide member 161 is provided with two sets of twin guide members 165, 165 on the right and left sides thereof. These two sets of twin guide members 165, 165 are respectively engaged to be movable with the pair of the guide rails 163, 163 as discussed above.

The horizontal slide member 161 is connected to a weight 171 via a rotating body 177 and a chain 169, so that the permanent force is applied to the horizontal slide member 161 toward the workpiece 3.

There is a drive motor 163 mounted on the horizontal slide member 161, and a spindle 165 is connected to the drive motor 163. There is an upper and lower sides working rotary tool 167 connected to the spindle 165, and a lower side working stylus 169 and an upper side working stylus 171 are attached to the upper and lower parts of thereof.

The other structure is substantially the same as that of the first, second and the third embodiment, and the same numerals have been allotted to the same parts in the drawings.

Figure 24:
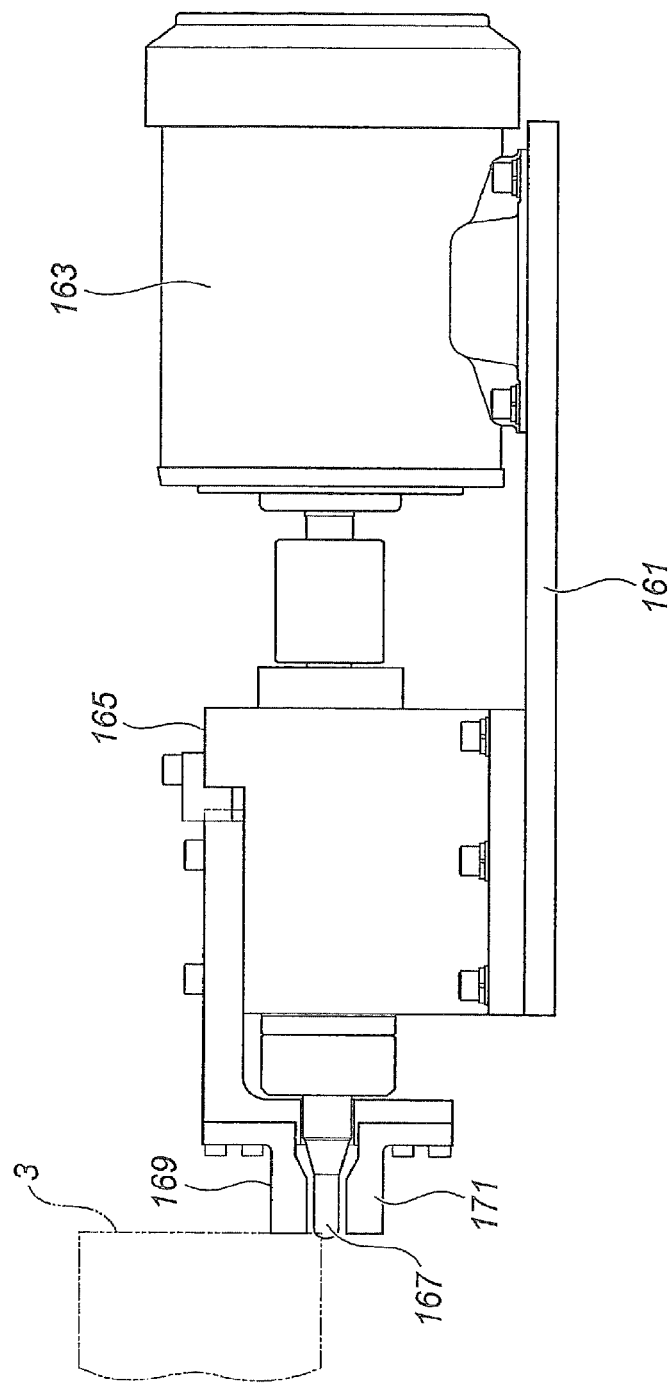
FIG. 24 A side view showing a structure of the spindle and the adjacent elements, according to the fourth embodiment of the present invention.
Figure 25:
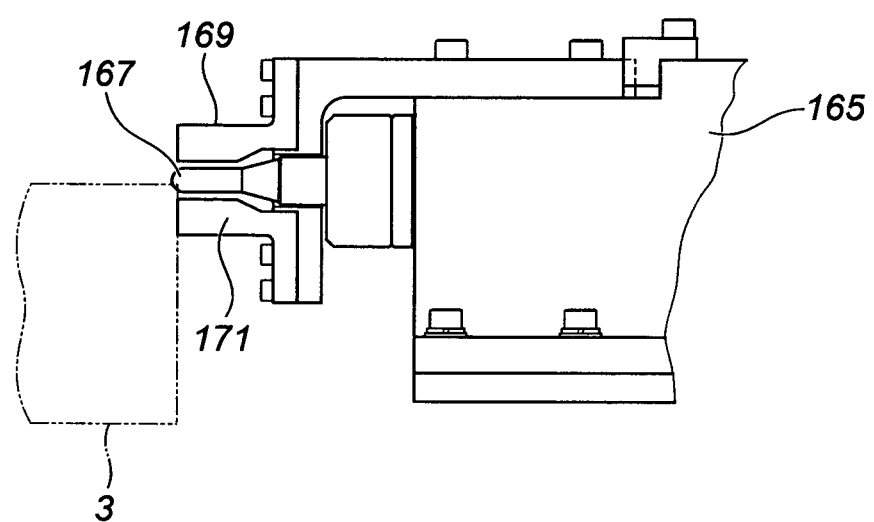
FIG. 25 A partial side view showing a structure of the spindle and the adjacent elements, according to the fourth embodiment of the present invention.

According to the above structure, FIG. 24 shows a state when the chamfering is carried out against the lower inner edge of the workpiece 3, and FIG. 25 shows a state when the chamfering is carried out against the upper inner edge of the workpiece 3.

Therefore, it is possible to obtain substantially the same effect as that of the first, second, third and fourth embodiments as discussed above.

The present invention is not limited to the first through fourth embodiments as discussed above.

First, according to the first through fourth embodiments, the chamfering is carried out against the outer or inner edges of the upper and lower sides, by considering a large-sized gear having external or internal teeth as a workpiece, but the present invention is not limited to such workpiece. There may be various types of workpiece capable of being chamfered, and the working is not limited to chamfering, and it is also possible to be applied to deburring, finishing, etc.

Further, the elements of the embodiments as shown in the drawings are merely for the purpose of examples, and the present invention is not limited to these elements.

INDUSTRIAL APPLICABILITY

The present invention relates to a working device which carries out deburring and chamfering against industrial parts having complicated shape such as gears (hereinafter "workpiece"), which have been manufactured by working machine through a process of cutting, die-casting, injection molding, punch pressing, lost-wax, die-forging, etc. In particular, the present invention relates to a working device having advanced performance for easy deburring and chamfering against the outer or inner edge of the both outer and inner surfaces of workpiece. For example, the present invention is suitable for deburring and chamfering of large-sized gear used for wind generator.

What is claimed is:

1. A working device comprising:
   a base stage,
   a workpiece hold and rotate means mounted on said base stage for holding and rotating a workpiece about an axis,
   a working means, mounted on said base stage, being movable in a forward direction to be closer to and in a rearward direction to be farther away from said workpiece axis, and provided with a working tool arrangement for carrying out a predetermined working on an obverse side and a reverse side of said workpiece that is opposite to said obverse side,
   a pressing means for pressing said working means toward said workpiece, and
   a tracing means provided on said working means, composed of a workpiece obverse side tracing member corresponding to said obverse side of said workpiece, and a further tracing member in the form of a workpiece reverse side tracing member corresponding to said reverse side of said workpiece, said workpiece obverse side tracing member and said workpiece reverse side tracing member both being configured for moving said working means in said forward and rearward directions by becoming in contact with said workpiece and tracing a shape of said workpiece.

2. The working device as claimed in claim 1, wherein said working tool arrangement is provided with a workpiece obverse side working tool corresponding to said obverse side of said workpiece, and with a workpiece reverse side working tool corresponding to said reverse side of said workpiece.

3. The working device as claimed in claim 2, further characterized in that:
   said workpiece obverse side working tool and said workpiece reverse side working tool are separately provided on a common working head, at positions on the common working head that are opposite to each other at an angle of 180 degrees apart, and said workpiece obverse side tracing member and said workpiece reverse side tracing member are respectively positioned adjacent to said workpiece obverse side working tool and said workpiece reverse side working tool.

4. The working device as claimed in claim 2, further characterized in that:
   said workpiece obverse side working tool and said workpiece reverse side working tool are separately provided on individual working heads that are provided separately, and said workpiece obverse side tracing member and said workpiece reverse side tracing member are respectively positioned adjacent to said workpiece obverse side working tool and said workpiece reverse side working tool.

5. The working device as claimed in claim 1, further characterized in that:
   said working tool arrangement is provided with a single working tool for carrying out a predetermined working on said obverse side and said reverse side of said workpiece, and a rotation axis of said working tool is orthogonal to the rotation axis of said workpiece hold and rotate means, and said workpiece obverse side tracing member and said workpiece reverse side tracing member are positioned opposite to each other by placing said working tool in the middle thereof.

6. The working device as claimed in claim 1, further characterized in that:
   said base stage is provided with a horizontal slide member being horizontally movable to be closer to and further away from said workpiece axis, and said horizontal slide member is provided with a vertical slide member being movable in upward and downward directions, and said vertical slide member is provided with another horizontal slide member, and said working means is provided on said another horizontal slide member so that said working means may move horizontally along said another horizontal slide member to and from said workpiece axis.

7. The working device as claimed in claim 1, further characterized in that:

said workpiece hold and rotate means is composed of an upper workpiece holding and driving roller mechanism provided to be movable, and a plurality of lower workpiece holding roller mechanisms provided to be movable.

8. The working device as claimed in claim 7, further characterized in that:

one of said plurality of lower workpiece holding roller mechanisms is a lower workpiece holding and driving roller mechanism.

* * * * *